(12) United States Patent
Alexandrov et al.

(10) Patent No.: US 9,185,150 B2
(45) Date of Patent: Nov. 10, 2015

(54) SYSTEM AND METHOD FOR MONITORING AND SELECTIVELY SHARING AN IMAGE IN AN IMAGE LIBRARY

(71) Applicant: CITRIX SYSTEMS, INC., Fort Lauderdale, FL (US)

(72) Inventors: Albert Alexandrov, Santa Barbara, CA (US); Tom Mahieu, Santa Barbara, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 22 days.

(21) Appl. No.: 13/875,954

(22) Filed: May 2, 2013

(65) Prior Publication Data
US 2013/0297696 A1 Nov. 7, 2013

Related U.S. Application Data

(60) Provisional application No. 61/643,304, filed on May 6, 2012, provisional application No. 61/643,303, filed on May 6, 2012.

(51) Int. Cl.
*H04L 29/06* (2006.01)
*G06F 15/16* (2006.01)
*G06F 9/54* (2006.01)
*H04N 7/15* (2006.01)
*H04L 12/18* (2006.01)

(52) U.S. Cl.
CPC ............... *H04L 65/403* (2013.01); *G06F 9/54* (2013.01); *H04L 12/1827* (2013.01); *H04N 7/15* (2013.01)

(58) Field of Classification Search
CPC ... G06Q 10/10; H04L 29/06; H04L 29/08081
USPC ........................................................ 709/204
See application file for complete search history.

(56) References Cited

U.S. PATENT DOCUMENTS 7,620,684 B2 * 11/2009 Von Savigny ................ 709/204
8,402,090 B2 * 3/2013 Nishida ......................... 709/204

(Continued)

FOREIGN PATENT DOCUMENTS

WO      2007081529       7/2007

OTHER PUBLICATIONS

International Search Report and the Written Opinion dated Oct. 30, 2013 from Corresponding PCT Application No. PCT/US2013/039264.

*Primary Examiner* — Wing F Chan
*Assistant Examiner* — Leon Y Tseng
(74) *Attorney, Agent, or Firm* — BainwoodHuang

(57) ABSTRACT

Systems and methods for sharing an image in a communication session are disclosed. In some aspects, a software application is run on a first computing device, while a communication application is run on the first computing device. The first computing device is associated with a presenter in a communication session implemented via the communication application. That one or more images were added to an image library of the first computing device since a time when the communication application started running on the first computing device is determined, using the communication application. The communication application facilitates transmission of at least one of the one or more images to one or more second computing devices. The one or more second computing devices are associated with one or more audience members in the communication session.

26 Claims, 10 Drawing Sheets

(56) References Cited

U.S. PATENT DOCUMENTS

| | | | |
|---|---|---|---|
| 2006/0031779 A1* | 2/2006 | Theurer et al. | 715/781 |
| 2007/0156434 A1* | 7/2007 | Martin et al. | 705/1 |
| 2007/0260715 A1* | 11/2007 | Alexandrov et al. | 709/223 |
| 2010/0128721 A1* | 5/2010 | Lee et al. | 370/352 |
| 2010/0250782 A1* | 9/2010 | Pratt et al. | 709/248 |
| 2010/0262925 A1* | 10/2010 | Liu et al. | 715/759 |
| 2010/0318312 A1* | 12/2010 | Bhat et al. | 702/108 |
| 2012/0143955 A1* | 6/2012 | Alexandrov et al. | 709/204 |
| 2012/0166952 A1* | 6/2012 | Alexandrov et al. | 715/730 |

* cited by examiner

SYSTEM AND METHOD FOR MONITORING AND SELECTIVELY SHARING AN IMAGE IN AN IMAGE LIBRARY

CROSS REFERENCE TO RELATED APPLICATIONS

This application claims priority under 35 U.S.C. §119(e) and the benefit of U.S. Provisional Application No. 61/643,304, filed May 6, 2012, and entitled, "Method and Apparatus for Monitoring and Selectively Sharing New Photo Libraries." and Provisional Application No. 61/643,303, filed May 6, 2012, and entitled, "Method and Apparatus for Monitoring and Transmitting New Photo Libraries," the entire disclosures of which are incorporated herein by reference.

BACKGROUND

Teleconferencing, videoconferencing, and desktop sharing sessions may be used to enable communication among parties in various geographical locations.

SUMMARY

In some aspects, the subject technology relates to a method for sharing a screenshot in a communication session. The method includes running one or more software applications on a first computing device, while a communication application is running on the first computing device, where the first computing device is associated with a presenter in a communication session implemented via the communication application, and where the one or more software applications are different from the communication application. The method includes determining, using the communication application, that the one or more images were added to an image library of the first computing device since a time when the communication application started running on the first computing device. The method includes facilitating transmission, using the communication application, of at least one of the one or more images to one or more second computing devices, where the one or more second computing devices are associated with one or more audience members in the communication session.

In some aspects, the subject technology relates to a non-transitory computer-readable medium for sharing a screenshot in a communication session. The computer-readable medium includes instructions for running one or more software applications on a first computing device, while a communication application is running on the first computing device, where the first computing device is associated with a presenter in a communication session implemented via the communication application, and where the one or more software applications are different from the communication application. The computer-readable medium includes instructions for determining, using the communication application, that the one or more images were added to an image library of the first computing device since a time when the communication application started running on the first computing device. The computer-readable medium includes instructions for facilitating transmission, using the communication application, of at least one of the one or more images to one or more second computing devices, where the one or more second computing devices are associated with one or more audience members in the communication session.

In some aspects, the subject technology relates to a computing device. The computing device includes one or more processors. The computing device includes a memory. The memory includes instructions. The instructions include code to run a software application in a foreground of the computing device, while a communication application is running in a background of the computing device, where the first computing device is associated with a presenter in a communication session implemented via the communication application, and where the software application is different from the communication application. The instructions include code to determine, using the communication application, that one or more images were added to an image library of the computing device since a time when the communication application started running on the first computing device. The instructions include code to facilitate transmission, using the communication application, of at least one of the one or more images to one or more remote computing devices, where the one or more remote computing devices are associated with one or more audience members in the communication session.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, certain structures and components are shown in block diagram form in order to avoid obscuring the concepts of the subject technology.

Figure 1A:
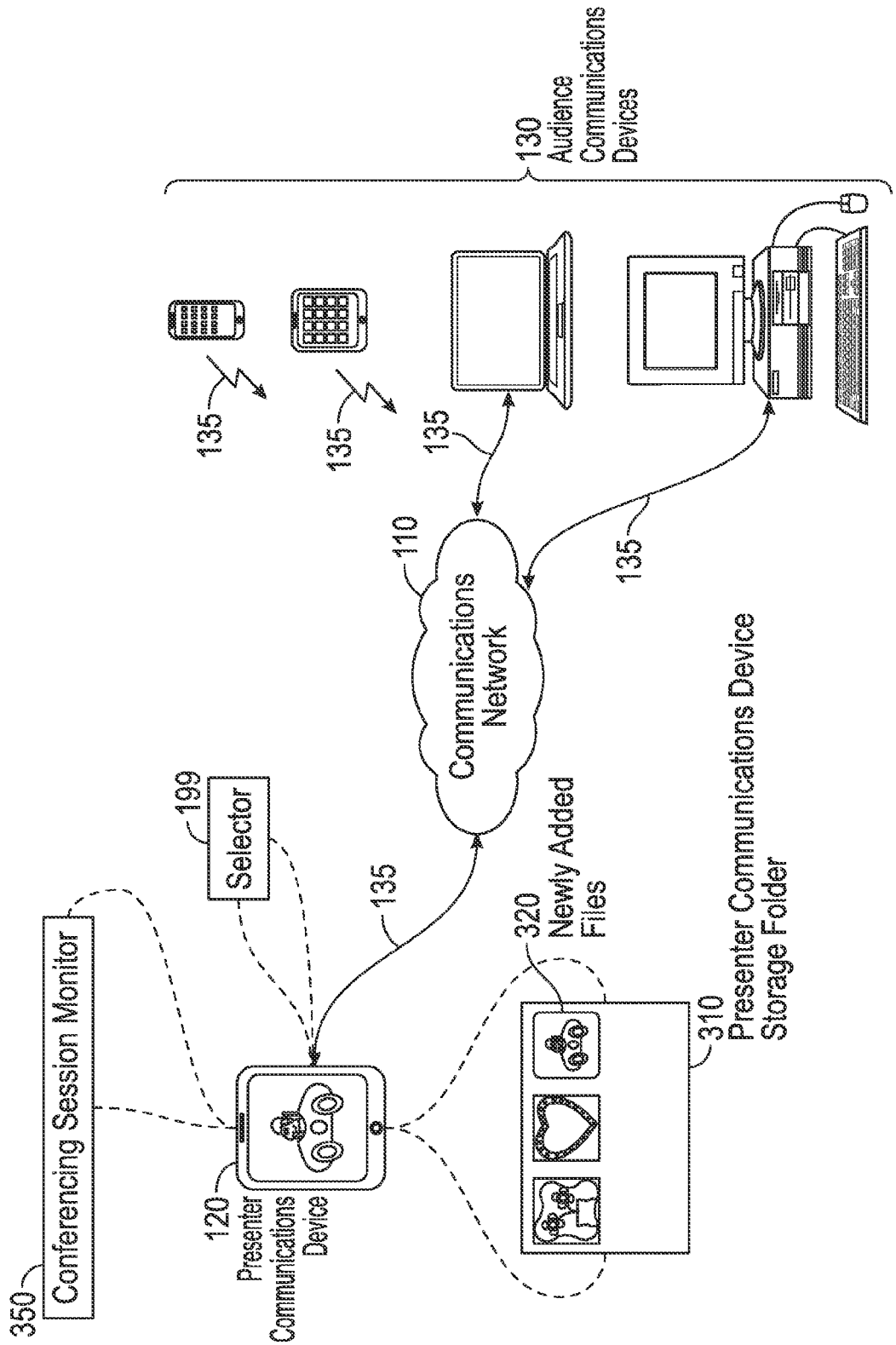
FIG. 1A is a block diagram of an example communications system.

FIG. 1A is a block diagram of a communications system 100. The communications system 100 includes multiple communications devices 120/130 that participate in a conferencing session with one another via the communications network 110.

In some examples, one communications device 120/130 may serve as a host communications device and the remaining communications devices may serve as client communications devices. For example, at any given time during the conferencing session, one or more of the communications devices 120/130 may server as a presenter device 120 (e.g., host device) and the remaining devices 120/130 may server as audience devices 130 (e.g., client device). The presenter device 120 may present material, such as data, desktop or screen contents, audio, images, or video contents with the audience devices 130.

Further, any number of communications devices 120/130 may participate in the conferencing session. During a conferencing session, any number of communications devices 120/130 may serve as the presenter 120 or audience 130 devices.

The conferencing session may allow the sharing of desktop screen contents, video, and audio between the presenter 120 and audience 130 communications devices. In some examples, the conferencing session allows simultaneous two-way data, audio, and video signal transmissions between the presenter 120 and audience 130 communications devices.

The presenter 120 and audience 130 communications devices may be mobile (e.g., wireless) or non-mobile (e.g., desktop) communications devices with video, audio, and desktop screen sharing capabilities. In some examples, any communications device that can support real-time peer-to-peer communications and support applications that provide desktop screen sharing sessions and user interaction may be used. Examples of the presenter 120 and audience 130 communications devices that may be used with the examples disclosed herein include, but are not limited to, mobile phones, Personal Digital Assistants, tablet computers, portable televisions, laptop computers, digital video/audio recorders, etc.

Each communications device 120/130 may include a display (not shown) for displaying shared data, shared desktop screen content, shared video content, and/or shared images. In some examples, the display may be a built-in display. In some examples, the display may be a separate unit that is coupled (e.g., wirelessly or through a physical connection such as a network connection) with the communications device 120/130. The video capabilities of presenter 120 and audience 130 communications devices may be provided by a module built-into the communications device 120/130. In some examples, the module that provides the presenter 120 and audience 130 communications devices with video capabilities may be an independent unit that is coupled with the presenter 120 and audience 130 communications devices.

In some examples, communications device 120/130 may include one or more audio inlets/outlets for inputting or outputting audio (e.g., microphone, speaker, etc.). In some examples, at least one of the audio inlets/outlets may be a built-in inlet/outlet. In some examples, at least one of the audio inlet/outlet may be a separate unit that is coupled (e.g., wirelessly or through a physical connection such as a network connection) with the communications device 120/130.

The presenter 120 and audience 130 communications devices may communicate directly or through intermediary communications devices (not shown). For example, one or more communications servers (shown in FIG. 1B) may facilitate communications between the presenter 120 and audience 130 communications devices. In some examples, the presenter 120 and audience 130 communications devices may communicate through secure and/or encrypted communications links.

The communications network 110 may be a high-bandwidth and/or band-limited communications network. In some examples, the communications network 110 may be a wireless communications network. In some examples, the communications network 110 may be a local area network (LAN), metropolitan area network (MAN), or a wide-area network (WAN), such as the Internet. In some examples, the network 110 may include one or more segments of one or more general purpose network (e.g., Internet, LAN, etc.) and/or other networks (e.g., Internet protocol (IP) network).

Depending on the type of communications device 120/130 used (e.g., mobile or desktop), the presenter 120 and audience 130 communications devices participate in the conferencing session through appropriate communications links 135 (e.g., wireless and/or wired communications links) and through appropriate communication networks 110.

In some examples, a conferencing session monitor 350 may monitor the presenter's communications device 230 and provide updates indicating newly added content to the audience communications devices 130. In some examples, the conferencing session monitor 350 may monitor one or more storage folders 310 of the presenter's communications device 230 for newly added files 320 (e.g., audio files, video files, data files, files including information regarding desktop/screen sharing) and share the newly added files with the audience communications devices 130. For example, the conferencing session may monitor an image folder 310 of the presenter's communications device 120 and share the newly added images 320 with the audience communications devices 130.

The conferencing session monitor 350 may be located within the presenter communications device 120 or be external to the presenter communications device 120. In some examples, the conferencing session monitor 350 may be positioned down stream with respect to the presenter communications device 120 and/or within the communications network 110. In some examples, the conferencing session monitor 350 may be internal to one or more of the audience communications devices 130.

In some examples, a selector 199 may be coupled with the presenter 120 and/or audience 130 communications devices. The selector 199 may be internal to the communications device 120/130, be located within the network 110, or be downstream from the network 110. The selector processes the shared information in the newly added files 320 and selects certain portions of the file 320 for sharing with the audience communications devices 130. For example, the selector may remove information such as headers, tool bars, status bars, and other items that a presenter does not wish to share with the audience communications devices 130 and leave selected portions of the file for sharing. In some examples, the selector may remove certain features of the shared information and retain certain other features.

In some examples, the selector 199 may share a reduced (e.g., compressed) or enhanced version of the newly added file 320 with the audience communications devices 130. In some examples, the selector may perform certain functions, such as data processing, image processing, video processing, audio processing, etc. to reduce or enhance the shared information.

Figure 1B:
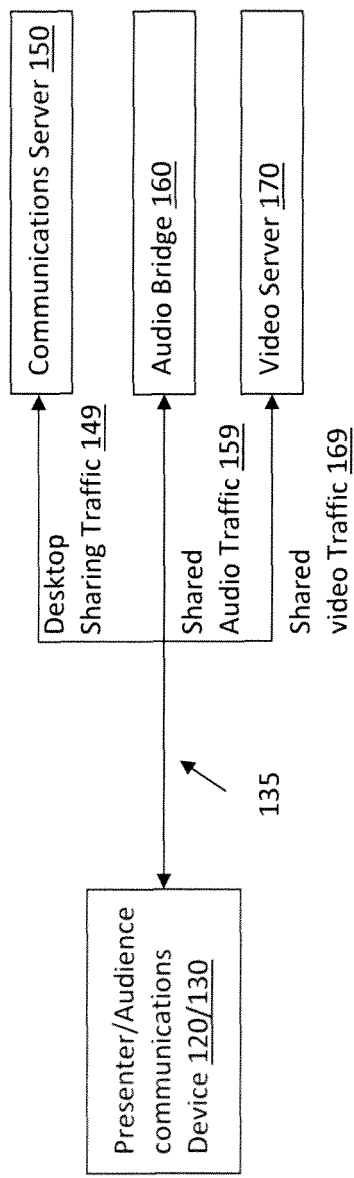
FIG. 1B is a block diagram of example communications servers.

FIG. 1B is a block diagram of a communications system 100A. In some examples, the presenter 120 and audience communications devices 130 may use one or more communications servers to facilitate communications with one another. For example, as shown in FIG. 1B, in some examples, the presenter 120 and audience communications devices 130 may connect to a communications server 150 that facilitates transmission of data traffic 149, including shared data and shared desktop screen content between the communications devices. In some examples, an audio server 160 (e.g., audio bridge 160) may be used to facilitate transmission of audio traffic 159 between the presenter 120 and audience communications devices 130 participating in the conferencing session. Further, in some examples, a video server 170 may be used to facilitate transmission of shared video traffic 169 between the communications devices 120/130.

The communications server 150, audio bridge 160, and video server 170 may be positioned within the network 110 or be downstream from the network 110.

Figure 2:
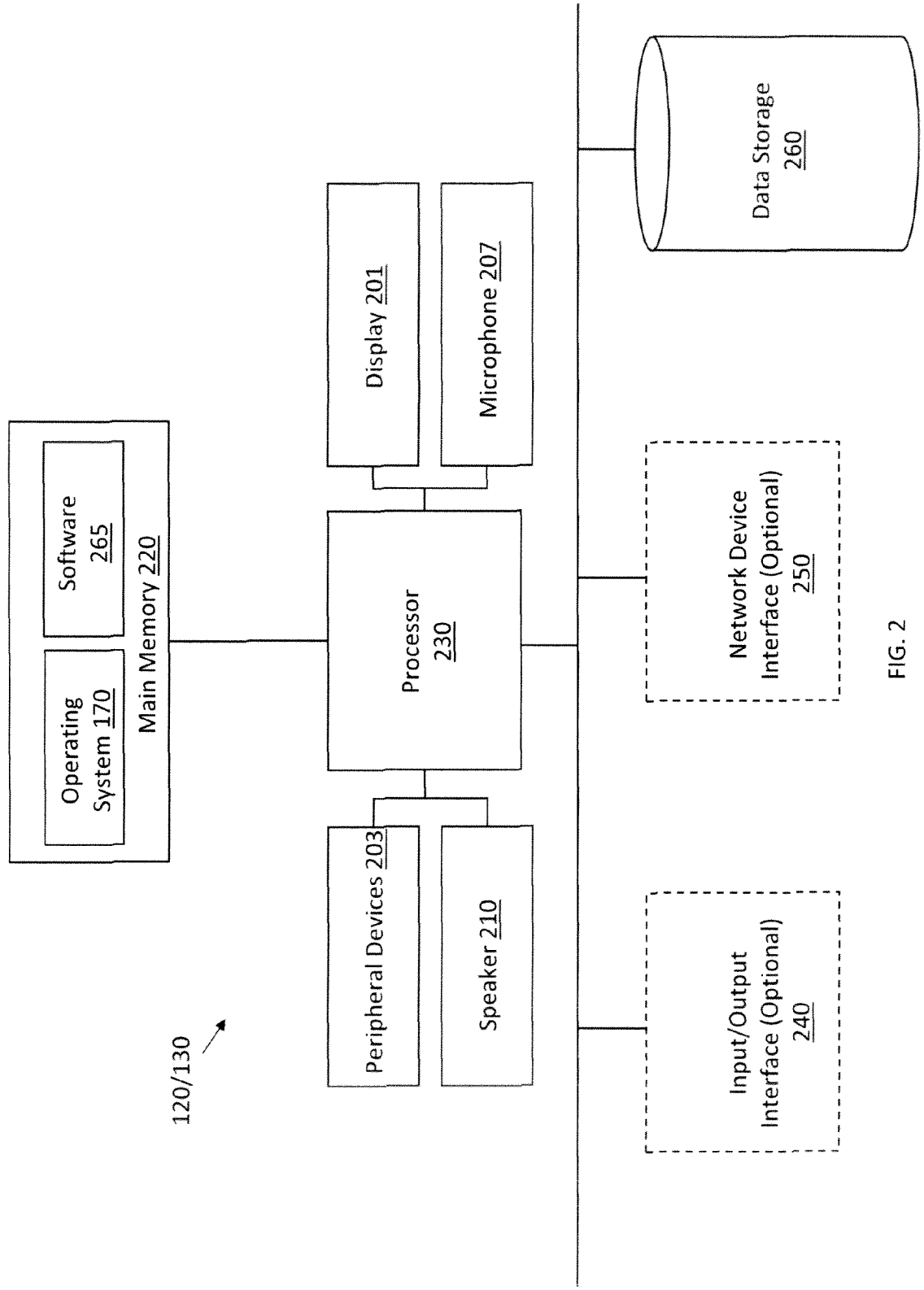
FIG. 2 is a block diagram of an example communications device.

FIG. 2 is a block diagram of a communications device 120/130. The device 120/130 may include a processor 230 (e.g., Central Processing Unit or CPU) that carries out the operations of the device, executes various instructions, and manipulates data structures from a main memory 220.

The processor 230 may be coupled with various interfaces via an input/output (I/O) device interface 240. The I/O device interface 240 may include logic to interface with various input and/or output devices, such as a keypad or mouse and with the processor 230, and allow signals to be transferred between the processor 230 and other components. Further, interface devices such as speaker 210, microphone 207, peripheral devices 203, and display 128 may be used to transfer signals to/from the processor 230 and main memory 220. In some examples, the input/output interface 240 may include a USB port (not shown).

In some examples, the communications device 120/130 may include a network device interface 250 that provides the device with access to a communications network 110. In some examples, an input/output network interface 240 may be used to transmit and receive the signals used for sharing content, such as video, audio, data, screen and desktop content, according to the examples described herein.

The main memory 220 may be a computer-readable memory and include combinations of non-volatile memory devices. The main memory 220 may also include an operating system 270 that implements various conventional operating system functions including memory management and controlled access to various devices, such as a database storage 260, and task and process scheduling. The data storage 260 may include content, for use with examples disclosed herein, such as images, text, video, audio, and computer applications. In some examples, the data storage 260 may classify the stored content within various folders, such as image folders, general data storage folders, etc.

In some examples, the storage 260 may be external to the device 120/130. For example, the storage 260 may be a remote database, within the network, or in a computing cloud.

The main memory 220 may be configured to hold various software 265 and computer-executable instructions and data structures including computer-executable instructions and data structures that implement aspects of the techniques described herein.

For example, the software 265 may implement the procedures for monitoring one or more storage folders 310 (FIG. 1A) of the storage portion 260 of the communications device 120/130. In some examples, the software 265 may further implement the procedures for sharing the content stored within the storage area 260 or storage folders 310 with the other communications devices 130 involved in the conferencing session. In some examples, the software 265 may further implement the features for selecting features for sharing with the audience communications devices 130. For example, the software may implement the features for processing (e.g., removing, compressing, enhancing, etc) the shared content.

As noted previously, alternatively, in some examples, an application program (not shown) or a module (not shown) positioned in the network 110 (shown in FIG. 1) may be responsible for monitoring the storage folders 310 of the communications device 120/130, selecting content for sharing, and/or sharing the information stored in the storage folders 310 the other communications devices 130 involved in the conferencing session.

Figure 3:
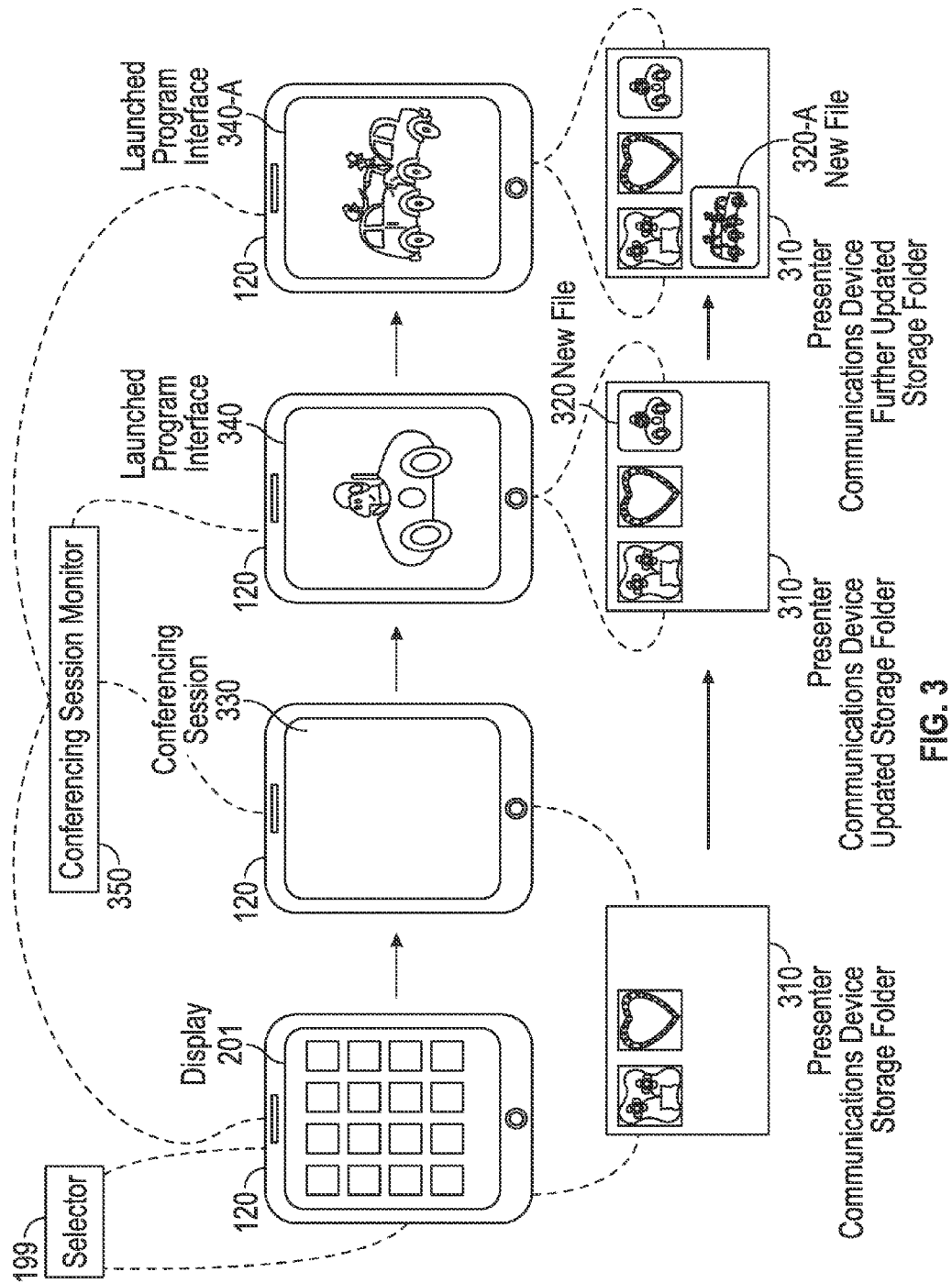
FIG. 3 is a diagram of an example process for storing and sharing images during a conferencing session.

FIG. 3 is a diagram of procedures for storing and sharing images during a conferencing session according to some examples disclosed herein. As shown in FIG. 3, a communications device 120 may be involved in a conferencing session with one or more communications devices (not shown). Although shown as a tablet computer, the communications device 120 may be any known communications device in the art, such as mobile phones, Personal Digital Assistants, tablet computers, portable televisions, laptop computers, digital video/audio recorders, etc. As noted previously, the communications device 120 may include a display 201 which may be a built-in display 201 or an external display that has been coupled with the communication device 120.

In some examples, upon activating a conferencing session 330, the conferencing session monitor 350 is activated. The session monitor 350 may be activated by a user of the communications device 120 or, automatically, in response to activating other programs or in response to initiation of the conferencing session.

Once activated, the communications device 120 user (not shown) may proceed to work with other programs on his/her communications device 120. Although the user is working with other programs (e.g., a mobile application program), the conferencing session 330 is moved to the background where it remains active and continues to run in the background of the communications device.

As noted, the conferencing session monitor 350 continues to be active and continues to actively monitor the storage folder 310 of the presenter's device. As the user is working with the interface 340 of the program (e.g., working with an application programming interface), he/she may wish to share some information regarding the launched program, such as an image of the launched program interface 340, with one or more audience communications devices 130 (shown in FIG. 1A) involved in the conferencing session 330. Some examples disclosed herein provide the user with the ability to do so (e.g., share the information regarding the launched program) without having to exit the program and return to the conferencing session 330. Specifically, in order to share the information regarding the launched program with the other users, the user of the communications device may create a file 320 including information regarding the launched application and save that file in a storage folder 310.

For example, the user may wish to share an image of the launched program interface 340 with the other participants in the conferencing session. To do so, the user may obtain a screen image 320 of the launched program interface 340. In some examples, the screen image 320 may be at least one of a screen dump, screen dump, screen shot, screen capture, screen grab, or print screen (hereinafter collectively referred to as the "screen shot"). In some examples, the screen image 320 may be any image taken by a computer to record the visible items displayed on the display 201 of the communications device. The screen shot may be obtained by any technique known in the art. For example, the screen shot may be obtained by employing a hardware key, such as by pressing certain keys on a keyboard, by using certain device keys, by touching the screen, etc.

Once the user has obtained a file including information regarding the launched program, the file is stored in a location in the storage area 260 of the communications device 120. In some examples, the obtained file may be stored in a storage folder 310 of the presenter's communications device. As noted above, the conferencing session monitor 350 monitors this folder 310 and detects any newly added files to this folder. The newly added files may be processed by the selector 199 which processes the new files and reduces (or enhances) the files by removing (or adding) certain features and retaining other features. For example, certain features, such as toolbars, status bars, etc., may be removed from the newly added files. Once processed by the selector, the file may be shared with the other participants in the conferencing session.

In some examples, the file including the shared information may be automatically, and without any user interaction, stored by the communications device 120 in the storage folder 310. In some examples, the shared information may be stored in the storage folder 310 through user interaction and by the user of the communications device.

In some examples, the selector 199 may automatically, and without any user interaction, operate on the newly stored files to select/process the features that are being shared. In some examples, the operations carried out by the selector 199 may be triggered by user interaction (user of at least one of the presenter and/or audience communications devices 120/130).

In some examples, a user of the communications device 120 may identify the storage folders 310 whose contents may be shared with the participants of the conferencing session. In some examples, not all participants of the same conferencing session receive the same amount of shared information. Specifically, the communications device 120 may identify certain storage folders 310 as folders whose updates contents may be shared with certain participants in the conferencing session and certain other folders as folders whose updates contents may be shared with certain other participants.

Once a file is saved in the storage folder 310 of the communications device 120, the user may choose to continue working with the launched program or launch another program. The user may continue sharing information with the other participants in the conferencing session by obtaining additional files and storing the files in designated storage folders 310.

For example, as shown in FIG. 3, the user may continue working with the launched program or launch another program. If the user decides to once again share information regarding the launched program (for example, share information regarding updates to the launched program interface 340-A), he/she may obtain another file 320-A (e.g., another screen shot) and store that file in the storage folder 310. The conferencing session monitor detects this update to the storage folder 310. The selector (not shown) may operate on the stored file to reduce/enhance the features in the file and/or select certain features for sharing. Once processed by the selector, the portions selected for sharing by the selector may be shared with the other participants of the conferencing session.

Figure 4:
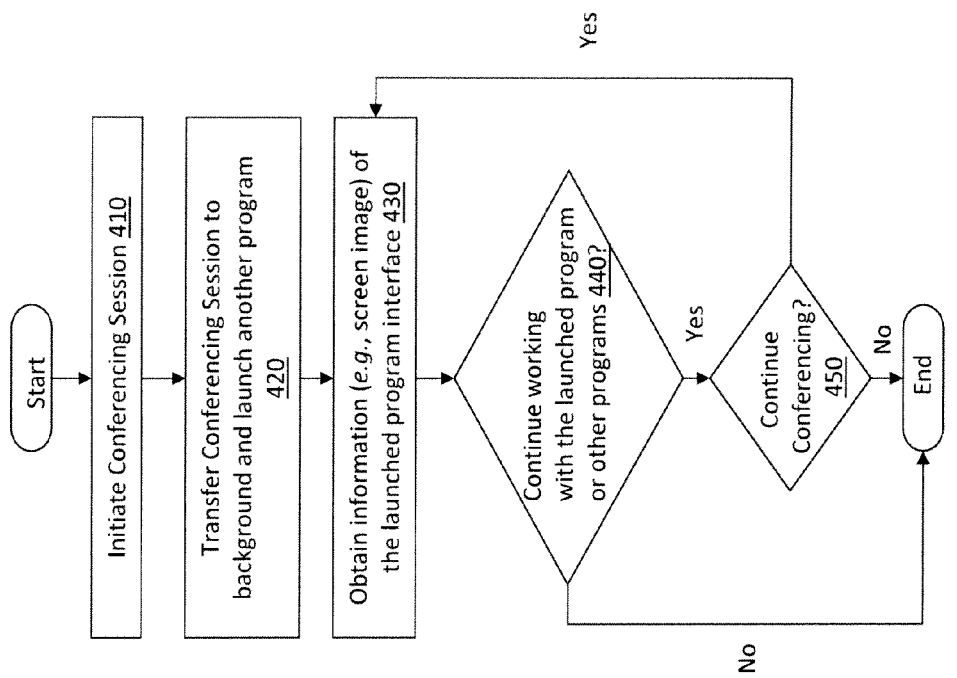
FIG. 4 is a flow diagram of an example process for storing images during a conferencing session.

FIG. 4 is a flow diagram of procedures for storing images during a conferencing session. A communications device 120/130 may initiate a conferencing session with one or more parties (participants) 410.

The initiation of the conferencing session activates the conferencing session monitor (shown in FIG. 3). The conferencing session, once activated, may be transferred to the background of the communications device 120/130 by launching another program. If a user wishes to share information regarding the launched program with the other participants, he/she may obtain information of the launched program (e.g., screen shot of the launched program interface) 430. The obtained information (e.g., screen image) is stored in a storage folder. The user may choose to continue working with the launched application or select another application to work with 440. In either case, if the conferencing session is still active 450, the user may continue to create new files (e.g., screen shots) including information regarding the program that he/she is working with. The newly created files are stored in the storage folder. The conferencing session monitor (shown in FIG. 3) continues to monitor the storage folder of the communications device to determine if a new file is detected. The selector (not shown) may operate on any newly detected file to reduce/enhance the features in the file and/or select certain features for sharing. Once processed by the selector, the portions selected for sharing by the selector may be shared with the other participants of the conferencing session.

Figure 5:
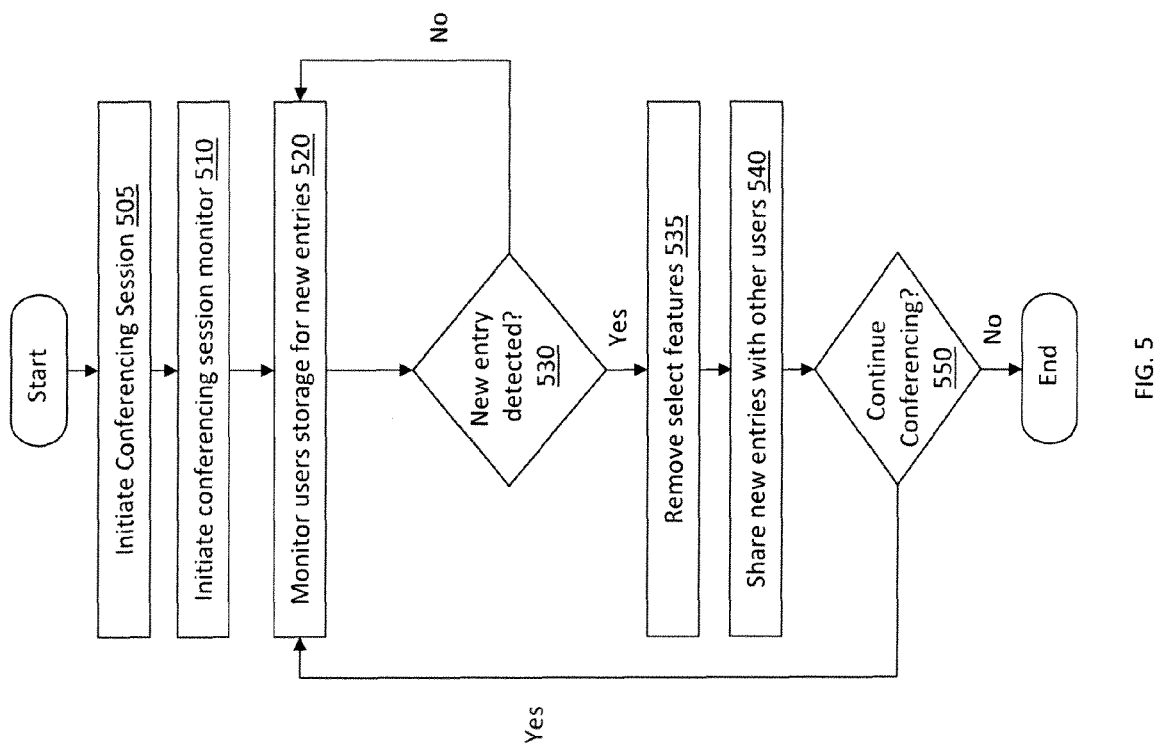
FIG. 5 is a flow diagram of an example process for sharing images during a conferencing session.

FIG. 5 is a flow diagram of procedures for sharing images during a conferencing session. A communications device 120/130 may initiate a conferencing session with one or more parties (participants) 505 using their own respective communications devices 120/130. The initiation of the conferencing session activates the conferencing session monitor 510. The conferencing session monitor monitors the storage area of the communications device 120/130 and checks for newly added files 530. If a newly added file is detected, the selector may operate on any newly detected file to reduce/enhance the features in the file and/or select certain features for sharing 535. Once processed by the selector, the portions selected for sharing by the selector may be shared with the other participants of the conferencing session 540. As long as the conferencing session is maintained 550, the conferencing session monitor continues to monitor the user storage for new entries 520. If a newly added entry is detected 530, the selector may operate on the newly detected entry to reduce/enhance the features in the file and/or select certain features for sharing 540. Once processed by the selector, the portions selected for sharing by the selector may be shared with the other participants of the conferencing sessions 540.

Certain operating systems do not allow screen capture as an application. This renders building remote conferencing and remote assistance difficult, as one cannot capture the screen when other applications are the active application. Some examples initiate a conferencing session that is coupled with conferencing session monitoring described herein. The user (e.g., customer, expert, or presenter) may transfer the conferencing session application in the background where it continues to run. The user may open other applications and manually take screen shots of the application that he/she is working with (for example, open up book reading application programming interface and take a screen shot by pressing certain hardware buttons of his/her device). The conferencing session monitor is monitoring the user's storage folders and waiting for new images to be added. As soon as it detects that a new image has been added, it automatically shares the new image with the other attendees in the session. The customer, presenter, or expert user does not need to reopen the conferencing session monitor and may stay in the current application. In some examples, the content portions on applications may be selectively shared. Specifically, in some examples, in place of sharing an entire file (e.g., an entire window of an image), certain features of the content area of the application are shared. For example, in an image, items such as toolbars and status bars and items that the presenter does not wish to share with the participants may be removed and the remaining features are shared.

Figure 6:
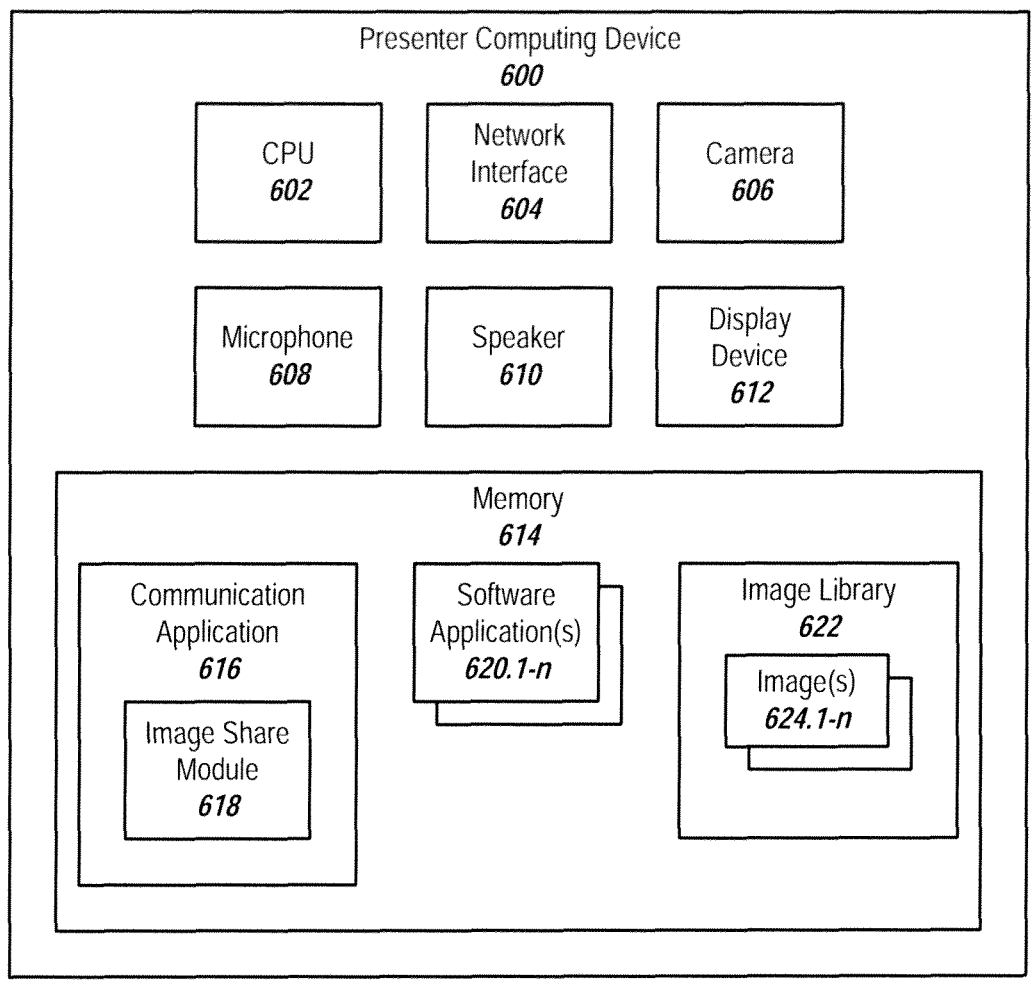
FIG. 6 is a block diagram of an example presenter computing device.

FIG. 6 is a block diagram of an example presenter computing device 600. The presenter computing device 600 can correspond to the presenter communications device 120 of FIG. 1A. The presenter computing device 600 can be one of a laptop computer, a desktop computer, a mobile phone, a tablet computer, a personal digital assistant (PDA), an electronic music player, a television with one or more processors embedded therein or coupled thereto, etc. According to some examples, the presenter computing device 600 has an operating system that does not allow an application that is running in the background to capture the screen of other software application(s) that are running in the foreground. Examples of such operating systems include some versions of iOS® operating systems developed by Apple Corporation of Cupertino, Calif.

As shown, the presenter computing device 600 includes a central processing unit (CPU) 602, a network interface 604, a camera 606, a microphone 608, a speaker 610, a display device 612, and a memory 614. In some examples, the presenter computing device can be implemented without one or more of the network interface 604, the camera 606, the microphone 608, the speaker 610, or the display device 612, or one or more of the network interface 604, the camera 606, the microphone 608, the speaker 610, or the display device 612 can reside externally to the presenter computing device 600 and be connected to the presenter computing device 600 using a wired or wireless connection.

The CPU 602 is configured to execute computer instructions that are stored in a computer-readable medium, for example, the memory 614. The network interface 604 is configured to allow the presenter computing device 600 to transmit and receive data in a network, e.g., the communications network 110 of FIG. 1A. The network interface 604 may include one or more network interface cards (NICs). The camera 606 is configured to take photograph(s), which may be stored in the memory 614. The microphone 608 is configured to receive audio input, the audio input may be transmitted using the network interface 604 or stored in an audio file in the memory 614. The speaker 610 is configured to play audio output, for example, associated with a communication session in which the presenter computing device 600 is participating or audio stored in an audio file residing in the memory 614. The display device 612 can include one or more screens. The display device 612 is configured to display image(s) associated with application(s) executing on the presenter computing device 600.

The memory 614 stores data and/or instructions. The memory 614 may be one or more of a cache unit, a storage unit, an internal memory unit, or an external memory unit. As illustrated, the memory 614 includes a communication application 616, software application(s) 620.1-n, and an image library 622.

The communication application 616 can be implemented in software, hardware, or a combination of software and hardware. The communication application 616 is configured to allow the presenter computing device 600 to participate (e.g., present or receive data) in a communication session. A user of the presenter computing device 600 may use the communication application 616 to control the presented data or view received data in the communication session. As illustrated, the communication application 616 includes an image share module 618. The image share module 618 is configured to share image(s) from the image library 622 in the communication session. According to some examples, the image share module 618 is configured to determine that image(s) were added to the image library 622 since a time when the communication application started running, for example, because the user of the presenter computing device 600 took a new photograph or a new screenshot. The image share module 618 is configured to facilitate transmission of all or some of the image(s) added to the image library to audience member computing device(s) in the communication session. Example operations of the image share module 618 are discussed in greater detail in conjunction with FIG. 7 and FIG. 8 below.

The software application(s) 620.1-n can include any software application(s) on the presenter computing device 600, for example, an electronic book reading application, a web browser, an online or mobile banking application, an electronic messaging (e.g., email, short messaging service, multimedia messaging service, etc.) application, a word processing application, a slide show application, etc. In some examples, one or more of the software application(s) 620 may be running in the foreground of the presenter computing device 600, while the communication application 616 may be running in the background of the presenter computing device 600.

The image library 622 stores image(s) 624.1-n. The image library 622 can include one or more directories or folders of image(s) 624.1-n. The image(s) 624.1-n can include screenshot(s) from software application(s) 620.1-n, photograph(s) taken using the camera 606, or picture(s) downloaded via a network accessible using the network interface 604, for example, from a webpage or from a multimedia messaging service (MMS) message.

Figure 7:
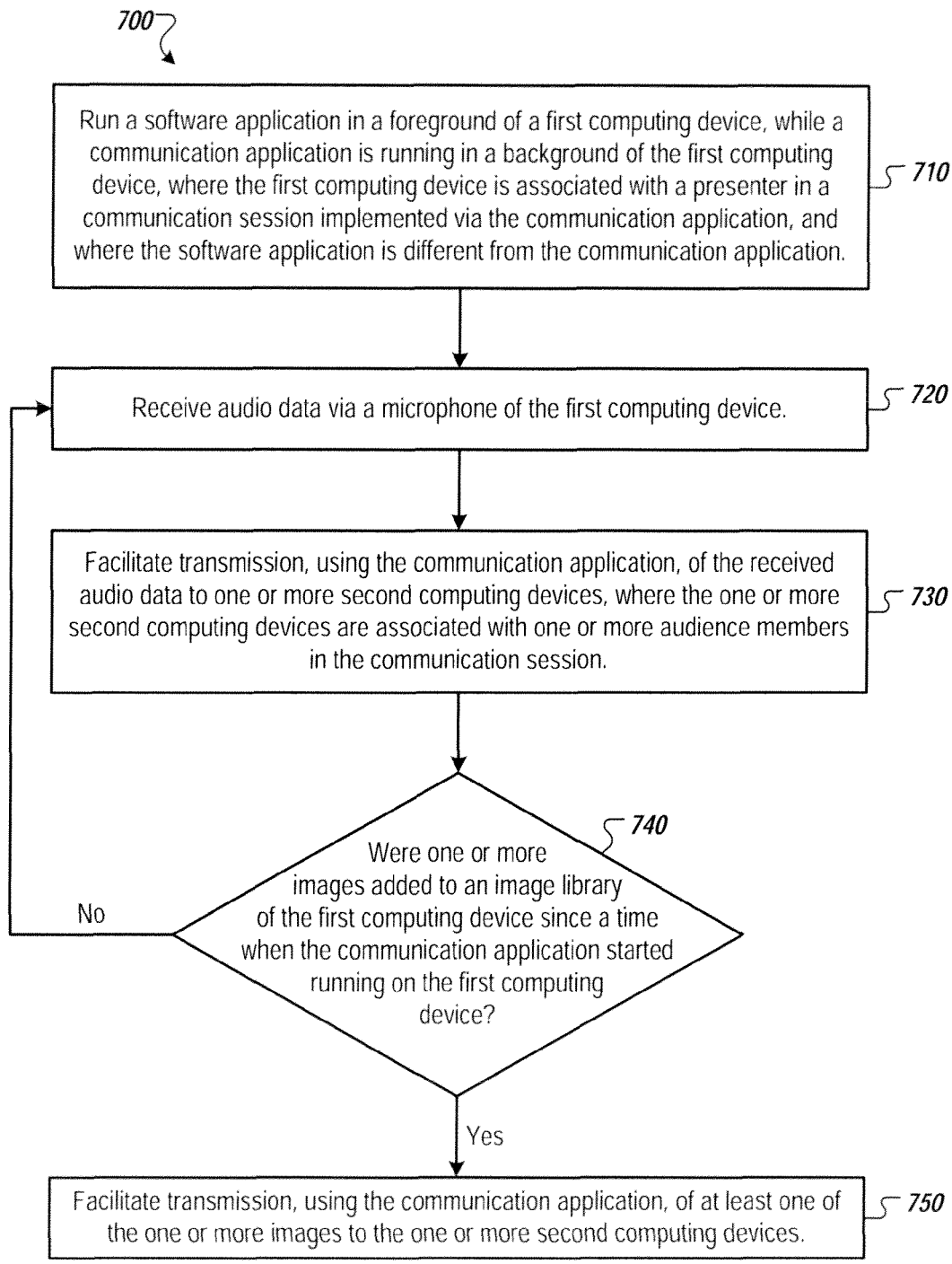
FIG. 7 is a flow diagram of an example process for sharing an image in a communication session.

FIG. 7 is a flow diagram of an example process 700 for sharing an image in a communication session.

The process 700 begins at step 710, where a first computing device (e.g., presenter computing device 600 or presenter communications device 120) runs a software application (e.g., one of the software applications 620.1-n) in a foreground of the first computing device, while a communication application (e.g., communication application 616) is running in a background of the first computing device. The first computing device is associated with a presenter in a communication session implemented via the communication application. The software application is different from the communication application. For example, the software application can be an electronic book reader application, a word processing application, a slide show application, etc. According to some implementations, the first computing device has an operating system that does not allow an application that is running in the background (e.g., the communication application) to capture the screen of other software application(s) that are running in the foreground. Examples of such operating systems include some versions of iOS® operating systems developed by Apple Corporation of Cupertino, Calif.

In step 720, the first computing device (e.g., via operation of the communication application 616) receives audio data via a microphone of the first computing device.

In step 730, the first computing device facilitates transmission, using the communication application, of the received audio data to one or more second computing devices (e.g., one or more of the audience communication device(s) 130). The one or more second computing devices are associated with one or more audience members in the communication session.

In step 740, the first computing device (e.g., via operation of the image share module 618 in the communication application 616) determines whether one or more images were added to an image library (e.g., image library 622, which includes image(s) 624.1-n) of the first computing device since a time when the communication application started running on the first computing device. Image(s) can be added to the image library, for example, if the user of the first computing device takes a screenshot from the software application or a photograph using a camera (e.g., camera 606) of the first computing device. Image(s) can be added to the image library, for example, if the user of the first computing device downloads picture(s) via a network. The picture(s) can include picture(s) downloaded via a webpage accessed via a web browser of the first computing device or picture(s) received in an electronic message (e.g., an email or multimedia messaging service (MMS) message) at the first computing device.

The first computing device can determine, using the communication application, whether one or more images were added to the image library by accessing, using the communication application, the image library once every threshold time period and determining whether one or more new images were added to the image library since a last accessing, using the communication application, of the image library. The threshold time period can be either a fixed time period (e.g., one second) or a variable time period. In some implementations, the threshold time period is between 0.9 and 1.1 seconds or is equal to one second.

If image(s) were added to the image library, the process 700 continues to step 750. If image(s) were not added to the image library, the process 700 returns to step 720.

In step 750, the first computing device facilitates transmission, using the communication application (e.g., using the image share module 618 in the communication application 616) of at least one of the one or more images to the one or more second computing devices. In some examples, the first computing device automatically (e.g., without user input) facilitates transmission of every one of the one or more images added to the image library since the time when the communication application started running on the first computing device. Alternatively, the first computing device can place (e.g., automatically or responsive to a user input) the communication application in the foreground of the first computing device. The first computing device can receive, using the communication application, a user selection of at least one of the one or more images for transmission to the one or more second computing devices. After step 750, the process 700 ends.

FIG. 7 illustrates one order in which the steps 710-750 of the process 700 can be implemented. However, the steps 710-750 can be implemented in any order. As described above, the steps 710-750 of the process 700 are implemented in series. However, in some implementations, two or more of the steps 710-750 of the process 700 are implemented in parallel. For example, steps 720 and 730 can be implemented simultaneously or in parallel with steps 740 and 750.

Figure 8:
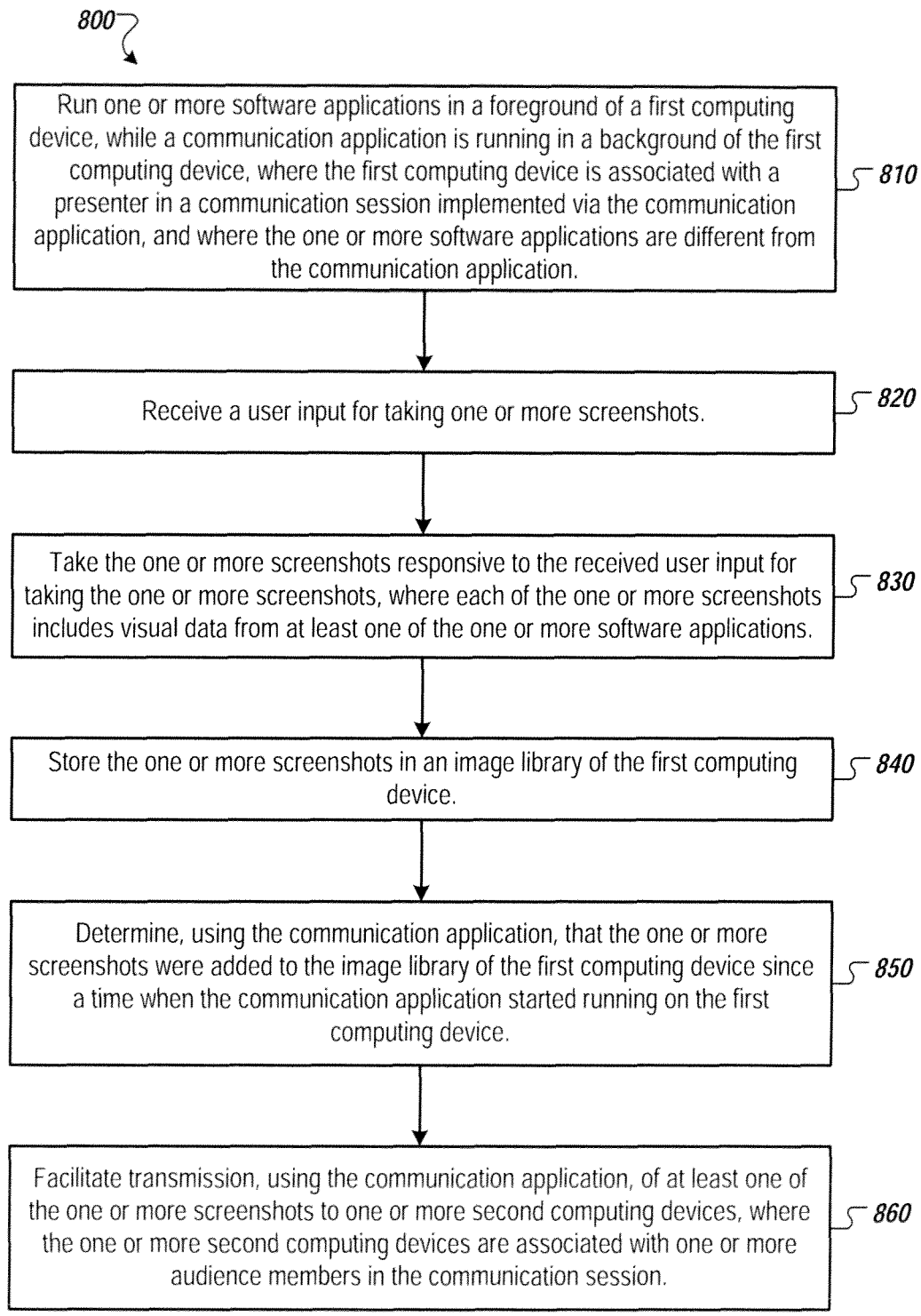
FIG. 8 is a flow diagram of an example process for sharing a screenshot in a communication session.

FIG. 8 is a flow diagram of an example process 800 for sharing a screenshot in a communication session.

The process 800 begins at step 810, where a first computing device (e.g., presenter computing device 600 or presenter communications device 120) runs one or more software applications (e.g., one or more of the software application(s) 620.1-$n$) in a foreground of a first computing device, while a communication application (e.g., communication application 616) is running in a background of the first computing device. The first computing device is associated with a presenter in a communication session implemented via the communication application. The one or more software applications are different from the communication application.

In step 820, the first computing device receives a user input for taking one or more screenshots. For example, the user of the first computing device can press a "print screen" button on the first computing device or enter a software or hardware command for taking a screenshot.

In step 830, the first computing device takes the one or more screenshots responsive to the received user input for taking the one or more screenshots. Each of the one or more screenshots includes visual data from at least one of the one or more software applications that is running in the foreground of the first computing device.

In step 840, the first computing device stores the one or more screenshots in an image library of the first computing device. (For example, the one or more screenshots can correspond to one or more of the image(s) 624.1-$n$ in the image library 622 of the presenter computing device 600.) In some examples, if photograph(s) were taken using a camera of the first computing device, the photograph(s) can also be stored in the image library.

In step 850, the first computing device determines, using the communication application, that the one or more screenshots were added to the image library of the first computing device since a time when the communication application started running on the first computing device. In some example, the first computing device can also determine, using the communication application, that photograph(s) were added to the image library since the time when the communication application started running on the first computing device.

In step 860, the first computing device facilitates transmission, using the communication application, of at least one of the one or more screenshots to one or more second computing devices (e.g., one or more of the audience communication device(s) 130). The one or more second computing devices are associated with one or more audience members in the communication session. In some examples, if photograph(s) were added to the image library since the time when the communication application started running on the first computing device, the first computing device can facilitate transmission, using the communication application, of at least one of the photograph(s) to one or more second computing devices. After step 860, the process 800 ends.

FIG. 8 illustrates one order in which the steps 810-860 of the process 800 can be implemented. However, the steps 810-860 can be implemented in any order. As described above, the steps 810-860 of the process 800 are implemented in series. However, in some implementations, two or more of the steps 810-860 of the process 800 are implemented in parallel.

The subject technology may be implemented with various use cases described herein. In one example use case, the presenter computing device has an operating system that does not allow an application that is running in the background to capture the screen of other software application(s) that are running in the foreground. The user of the presenter computing device is accessing technical support for a software application on the presenter computing device different from the communication application (e.g., an electronic book reading software application). The audience member is the technical support representative. To allow the technical support representative to see what the presenter's screen displays when the problem occurs, the presenter reproduces the problem and manually takes a screen shot (e.g., using a "print screen" or "take screen shot" button on the presenter computing device) of his/her screen while using the software application. The screen shot is transmitted to the audience member using the techniques described herein.

In another example use case, the presenter computing device is a computing device of a teacher of an online course teaching students (audience members) how to use a software application (e.g., a computer-aided design application). To allow the audience members to see what the presenter is doing with the software application, the presenter manually takes screen shots of the software application whenever he/she takes an action in the software application. The manually taken screen shots are transmitted to the audience members using the techniques described herein.

In yet another example use case, the presenter computing device is presenting a slide show using a software application (e.g., a slide show application) different from the communication application to audience members in an online meeting. Upon changing slides, the presenter manually takes a screen shot of his/her screen. The manually taken screen shot is then transmitted to the audience members who can view the slides on the audience member computing devices.

In one more example use case, the presenter computing device is associated with a user installing hardware in his/her home, for example, the user may be wiring a home telephone system or connecting a television with a storage unit storing digital video files. The audience member computing device is associated with a remote technical support representative helping the user install the hardware. To allow the remote technical support representative to see what the user is doing, the user can take photograph(s) of the hardware installation using the presenter computing device, and the photograph(s) can be transmitted to the audience member computing device using some of the techniques disclosed herein. The example use cases described herein are not the only use cases for the subject technology, which can also be used in other scenarios.

Figure 9:
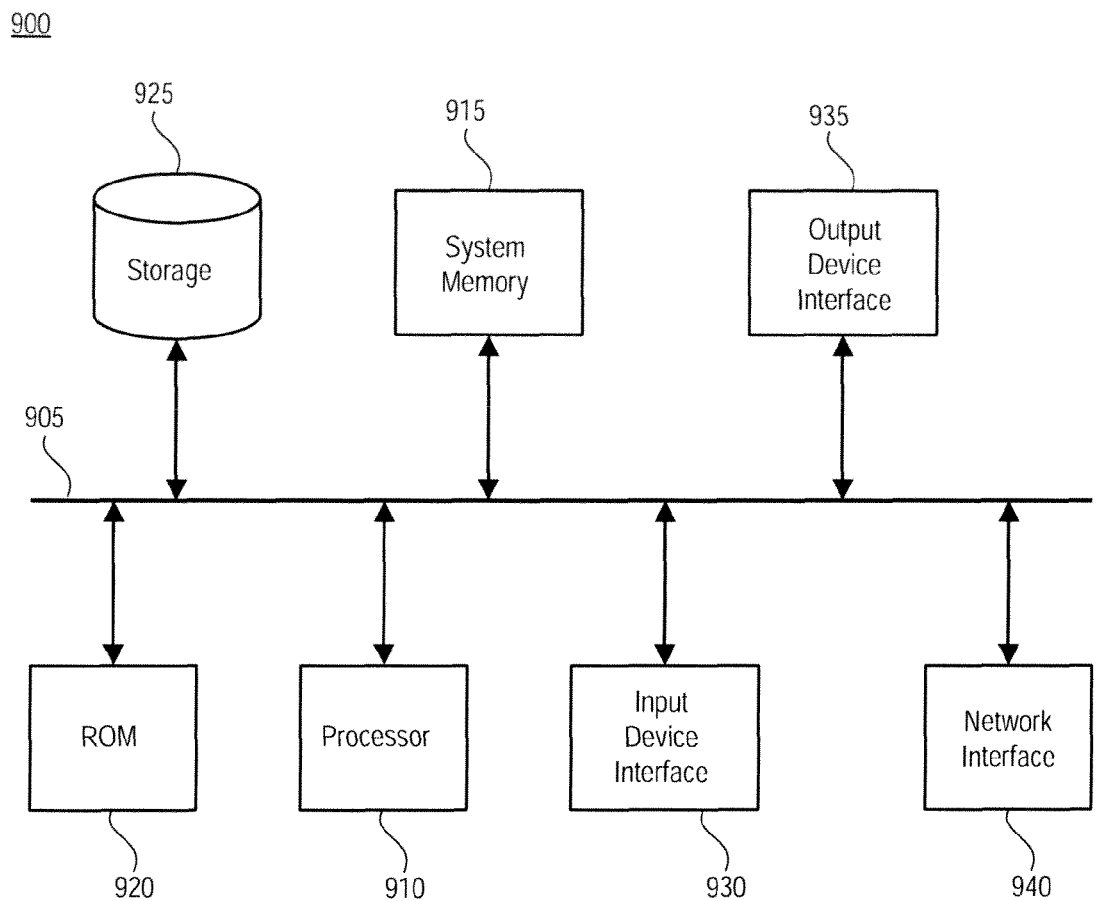
FIG. 9 conceptually illustrates an example electronic system with which some implementations of the subject technology are implemented.

FIG. 9 conceptually illustrates an electronic system 900 with which some implementations of the subject technology are implemented. For example, one or more of the presenter communications device 120, the audience communications devices 130, or the presenter computing device 600 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is anon-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for sharing an image in an image library in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD), Some implementations include devices for example a touch screen that functions as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment, A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically no stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The invention claimed is:

1. A method for sharing a screenshot in a communication session, the method comprising:
running one or more software applications on a first computing device, while a communication application is running on the first computing device, wherein the first computing device is associated with a presenter in a communication session implemented via the communication application, and wherein the one or more software applications are different from the communication application;
determining, at the first computing device and using the communication application, that the one or more images were added to an image library residing at the first computing device since a time when the communication application started running on the first computing device, wherein the image library residing at the first computing device stores one or more directories or folders of images, the one or more directories or folders of images comprising photographs taken using a camera of the first computing device and screenshots, wherein determining, using the communication application, that the one or more images were added to the image library comprises:
accessing, using the communication application, the image library once every threshold time period; and
determining that one or more new images were added to the image library during a last threshold time period;
in response to determining that the one or more images were added to the image library residing at the first computing device, facilitating transmission, using the communication application, of at least one of the one or more images from the first computing device to one or more second computing devices, wherein the one or more second computing devices are associated with one or more audience members in the communication session;
initially transferring the communication application to a background of a display of the first computing device to facilitate the presenter working with the one or more software applications; and
wherein the facilitating transmission further comprises automatically moving the communication application from the background of the display of the first computing device to a foreground of the display of the first computing device, in response to determining that the one or more images were added to the image library residing at the first computing device, to facilitate selection by the presenter of at least one of the one or more new images that were added to the image library during the last threshold time period for transmission to the one or more second computing devices, and automatically transmitting the at least one of the one or more images added to the image library during the last threshold time period in response to selection by the presenter of the at least one of the one or more images added to the image library during the last threshold time period.

2. The method of claim 1, the method further comprising:
receiving, using the communication application, a user selection of the at least one of the one or more images for transmission to the one or more second computing devices.

3. The method of claim 1, wherein the threshold time period comprises a variable time period.

4. The method of claim 1, further comprising:
receiving audio data via a microphone of the first computing device; and
facilitating transmission, using the communication application, of the received audio data to the one or more second computing devices,
wherein steps of receiving audio data and facilitating transmission of the received audio data are implemented in parallel with steps of running the software application, determining that the one or more images were added to the image library, and facilitating transmission of the at least one of the one or more images.

5. The method of claim 1, further comprising:
facilitating receipt, using the communication application, of remote audio data from the one or more second computing devices, in parallel with steps of running the software application, determining that the one or more images were added to the image library, and facilitating transmission of the at least one of the one or more images.

6. The method of claim 1, wherein the one or more images comprise one or more screenshots, the method further comprising:
receiving a user input for taking the one or more screenshots;
taking the one or more screenshots responsive to the received user input for taking the one or more screenshots, wherein each of the one or more screenshots comprises visual data from at least one of the one or more software applications; and
storing the one or more screenshots in the image library of the first computing device.

7. The method of claim 6, wherein the one or more images comprise one or more photographs, the method further comprising:
taking the one or more photographs using a camera of the first computing device; and
storing the one or more photographs in the image library of the first computing device.

8. The method of claim 1, wherein the threshold time period is between 0.9 and 1.1 seconds.

9. The method of claim 1, wherein the threshold time period is equal to one second.

10. The method of claim 1, wherein the threshold time period is a fixed time period.

11. The method of claim 1, further comprising:
wherein transferring the communication application to the background of the display of the first computing device comprises automatically moving at least a portion of a user interface of one of the one or more software applications to the foreground of the display of the first computing device; and
wherein the one or more images comprise a screenshot including the portion of the user interface of the one or more software applications in the foreground of the display of the first computing device.

12. The method of claim 11, further comprising:
wherein the screenshot includes at least one user interface feature; and
wherein the facilitating transmission includes automatically reducing the screenshot by removing the user interface feature from the screenshot prior to transmission of the screen shot to the one or more second computing devices.

13. The method of claim 1, further comprising:
wherein the directories or folders of images within the image library comprise:
a first folder having contents that may be shared only with a subset of the audience members in the communication session, and
a second folder having contents that may be shared with audience members in the communication session other than the subset of audience members;
wherein the one or more images are contained in the first folder; and
wherein the facilitating transmission only transmits the one or more images to those of the one or more second computing devices that are associated with audience members that are within the subset of the audience members in the communication session.

14. A non-transitory computer-readable medium for sharing an image in a communication session, the non-transitory computer-readable medium comprising instructions for:
running one or more software applications on a first computing device, while a communication application is running on the first computing device, wherein the first computing device is associated with a presenter in a communication session implemented via the communication application, and wherein the one or more software applications are different from the communication application;
determining, at the first computing device and using the communication application, that the one or more images were added to an image library residing at the first computing device since a time when the communication application started running on the first computing device, wherein the image library residing at the first computing device stores one or more directories or folders of images, the one or more directories or folders of images comprising photographs taken using a camera of the first computing device and screenshots, wherein determining, using the communication application, that the one or more images were added to the image library comprises:
accessing, using the communication application, the image library once every threshold time period; and
determining that one or more new images were added to the image library during a last threshold time period;
in response to determining that the one or more images were added to the image library residing at the first computing device, facilitating transmission, using the communication application, of at least one of the one or more images from the first computing device to one or more second computing devices, wherein the one or more second computing devices are associated with one or more audience members in the communication session;
initially transferring the communication application to a background of a display of the first computing device to facilitate the presenter working with the one or more software applications; and
wherein the facilitating transmission further comprises automatically moving the communication application from the background of the display of the first computing device to a foreground of the display of the first computing device, in response to determining that the one or more images were added to the image library residing at the first computing device, to facilitate selection by the presenter of at least one of the one or more images new images that were added to the image library during the last threshold time period for transmission to the one or more second computing devices, and automatically transmitting the at least one of the one or more images added to the image library during the last threshold time period in response to selection by the presenter of the at least one of the one or more images added to the image library during the last threshold time period.

15. The non-transitory computer-readable medium of claim 14, the non-transitory computer-readable medium further comprising instructions for:
receiving, using the communication application, a user selection of the at least one of the one or more images for transmission to the one or more second computing devices.

16. The non-transitory computer-readable medium of claim 14, wherein the threshold time period comprises a variable time period.

17. The non-transitory computer-readable medium of claim 14, further comprising instructions for:
receiving audio data via a microphone of the first computing device; and
facilitating transmission, using the communication application, of the received audio data to the one or more second computing devices,
wherein steps of receiving audio data and facilitating transmission of the received audio data are implemented in parallel with steps of running the software application, determining that the one or more images were added to the image library, and facilitating transmission of the at least one of the one or more images.

18. The non-transitory computer-readable medium of claim 14, further comprising instructions for:
facilitating receipt, using the communication application, of remote audio data from the one or more second computing devices, in parallel with steps of running the software application, determining that the one or more images were added to the image library, and facilitating transmission of the at least one of the one or more images.

19. The non-transitory computer-readable medium of claim 14, wherein the one or more images comprise one or more screenshots, the non-transitory computer-readable medium further comprising instructions for:
receiving a user input for taking the one or more screenshots;
taking the one or more screenshots responsive to the received user input for taking the one or more screenshots, wherein each of the one or more screenshots comprises visual data from at least one of the one or more software applications; and
storing the one or more screenshots in the image library of the first computing device.

20. The non-transitory computer-readable medium of claim 19, the one or more images comprise one or more photographs, the non-transitory computer-readable medium further comprising instructions for:
taking the one or more photographs using a camera of the first computing device; and
storing the one or more photographs in the image library of the first computing device.

21. The non-transitory computer-readable medium of claim 14, wherein the presenter is one of a plurality of presenters in the communication session.

22. A computing device comprising:
one or more processors;
a memory comprising instructions which, when executed by the one or more processors, cause the one or more processors to:
run a software application on the computing device, while a communication application is running on the computing device, wherein the computing device is associated with a presenter in a communication session implemented via the communication application, and wherein the software application is different from the communication application;
determine, at the computing device and using the communication application, that one or more images were added to an image library residing at the computing device since a time when the communication application started running on the computing device, wherein the image library residing at the computing device stores one or more directories or folders of images, the one or more directories or folders of images comprising photographs taken using a camera of the computing device and screenshots, wherein determining, using the communication application, that the one or more images were added to the image library comprises:
accessing, using the communication application, the image library once every threshold time period; and
determining that one or more new images were added to the image library during a last threshold time period;
in response to determining that the one or more images were added to the image library residing at the computing device, facilitate transmission, using the communication application, of at least one of the one or more images from the computing device to one or more remote computing devices, wherein the one or more remote computing devices are associated with one or more audience members in the communication session;
initially transfer the communication application to a background of a display of the computing device to facilitate the presenter working with the one or more software applications; and
wherein the transmission by the communication application is further facilitated by automatically moving the communication application from the background of the display of the computing device to a foreground of the display of the computing device, in response to determining that the one or more images were added to the image library residing at the computing device, to facilitate selection by the presenter of at least one of the one or more images new images that were added to the image library during the last threshold time period for transmission to the one or more remote computing devices, and automatically transmitting the at least one of the one or more images added to the image library during the last threshold time period in response to selection by the presenter of the at least one of the one or more images added to the image library during the last threshold time period.

23. The computing device of claim 22, wherein the one or more images comprise a screenshot from the software application.

24. The computing device of claim 22, wherein the one or more images comprise a photograph taken using a camera of the computing device.

25. The computing device of claim 22, wherein the presenter in the communication session comprises a user troubleshooting the computing device, and wherein the one or more audience members comprise members of a technology support team.

26. The computing device of claim 22, wherein the initially transferring the communication application to a background of a display of the first computing device is responsive to launching the one or more software applications.

* * * * *